(12) United States Patent
Reed et al.

(10) Patent No.: US 11,789,636 B2
(45) Date of Patent: Oct. 17, 2023

(54) ENSURING SUFFICIENT SPACE IS AVAILABLE ON TARGET VOLUMES BEFORE PERFORMING A POINT-IN-TIME COPY JOB

(71) Applicant: International Business Machines Corporation, Armonk, NY (US)

(72) Inventors: David C. Reed, Tucson, AZ (US); David Michael Shackelford, Tucson, AZ (US); Donna Weaver, Lake Mary, FL (US); Susan Van Berkel, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 17/473,738

(22) Filed: Sep. 13, 2021

(65) Prior Publication Data

US 2023/0083038 A1   Mar. 16, 2023

(51) Int. Cl.
*G06F 12/00*   (2006.01)
*G06F 13/00*   (2006.01)
*G06F 3/06*   (2006.01)

(52) U.S. Cl.
CPC ............ *G06F 3/065* (2013.01); *G06F 3/0604* (2013.01); *G06F 3/0644* (2013.01);
(Continued)

(58) Field of Classification Search
CPC ...... G06F 3/065; G06F 3/0604; G06F 3/0644; G06F 3/0647; G06F 3/0659; G06F 3/0673
(Continued)

(56) References Cited

U.S. PATENT DOCUMENTS

| 5,555,389 | A  | * | 9/1996 | Satoh | G06F 3/0601 |
| | | | | | 707/999.203 |
| 7,526,623 | B1 | * | 4/2009 | Rao | G06F 12/023 |
| | | | | | 711/159 |

(Continued)

FOREIGN PATENT DOCUMENTS

| CN | 102880628 A | 1/2013 |
| CN | 109344090 A | 2/2019 |

OTHER PUBLICATIONS

Kesavan et al., "Efficient Free Space Reclamation in WAFL," ACM Transactions on Storage, vol. 13, No. 3, Sep. 2017, 29 pages.

(Continued)

*Primary Examiner* — Sheng Jen Tsai
(74) *Attorney, Agent, or Firm* — Zilka-Kotab, P.C.

(57) ABSTRACT

A computer-implemented method according to one embodiment includes, prior to executing a point-in-time copy job, running a space checker program to generate a list that includes: source data sets that will be used in the point-in-time copy job and a pool of potential target volumes that are eligible to be used for the point-in-time copy job. The method further includes determining that insufficient space is available on the potential target volumes to perform the point-in-time copy job. An on-demand migration is issued against one or more target volumes of the pool of potential target volumes for ensuring there is sufficient space available on the one or more target volumes associated with the issued on-demand migration to perform the point-in-time copy job. The method further includes performing the point-in-time copy job.

24 Claims, 5 Drawing Sheets

(52) U.S. Cl.
CPC .......... *G06F 3/0647* (2013.01); *G06F 3/0659* (2013.01); *G06F 3/0673* (2013.01)

(58) Field of Classification Search
USPC ...................................................... 711/165
See application file for complete search history.

(56) References Cited

U.S. PATENT DOCUMENTS

| | | | | |
|---|---|---|---|---|
| 7,953,946 | B2* | 5/2011 | Anand | G06F 11/1451 |
| | | | | 711/162 |
| 8,849,764 | B1* | 9/2014 | Long | G06F 11/1469 |
| | | | | 707/646 |
| 9,396,205 | B1* | 7/2016 | Lewis | G06F 16/182 |
| 10,007,671 | B1* | 6/2018 | Bono | G06F 3/0652 |
| 10,769,024 | B2* | 9/2020 | Subramanian | G06F 11/1451 |
| 2008/0010421 | A1* | 1/2008 | Chen | G06F 3/0644 |
| | | | | 711/162 |
| 2012/0096231 | A1* | 4/2012 | Morishita | G06F 3/0644 |
| | | | | 711/E12.002 |
| 2013/0073519 | A1* | 3/2013 | Lewis | G06F 3/067 |
| | | | | 707/610 |
| 2013/0151804 | A1* | 6/2013 | Alatorre | G06F 16/176 |
| | | | | 711/170 |
| 2014/0146916 | A1* | 5/2014 | Shattil | H04L 1/0681 |
| | | | | 375/295 |
| 2015/0178014 | A1 | 6/2015 | Nelson | |
| 2015/0193311 | A1* | 7/2015 | Provizor | G06F 11/1456 |
| | | | | 707/649 |
| 2015/0212756 | A1* | 7/2015 | Coronado | G06F 3/0685 |
| | | | | 711/114 |
| 2016/0364165 | A1 | 12/2016 | Appel et al. | |
| 2017/0075605 | A1* | 3/2017 | Sundarrajan | G06F 11/1451 |
| 2020/0394110 | A1* | 12/2020 | Ramohalli Gopala Rao | G06F 16/285 |

OTHER PUBLICATIONS

IBM, "FlashCopy," IBM Documentation, DS8880 8.4, 2016, 6 pages, retrieved from https://www.ibm.com/docs/en/ds8880/8.4?topic=services-flashcopy.

International Search Report and Written Opinion from PCT Application No. PCT/IB2022/057793, dated Dec. 13, 2022.

* cited by examiner

ENSURING SUFFICIENT SPACE IS AVAILABLE ON TARGET VOLUMES BEFORE PERFORMING A POINT-IN-TIME COPY JOB

BACKGROUND

The present invention relates to point-in-time copy operations, and more specifically, this invention relates to prevention of failure events associated with point-in-time copy operations being performed on source data sets where sufficient space is not available on participating target volumes.

In some conventional environments, point-in-time copies of data are performed on a source data sets in order to make a point-in-time copy of the data immediately available for read and/or write access on a participating target volume. These copies may include up to full volume copies of the data, and are often performed as part of a routine data backup process. Upon initiating a point-in-time copy operation, a point-in-time copy relationship is created between a source volume and a target volume. A point-in-time copy relationship typically includes a "mapping" of the point-in-time copy source volume and a point-in-time copy target volume. This mapping allows a point-in-time copy of a source data set of a source volume to be copied to the associated target volume. The point-in-time copy relationship may exist between this volume pair from the time that the point-in-time copy operation is initiated until a storage unit copies all data from the source volume to the target volume or the point-in-time copy relationship is deleted, in cases of a persistent point-in-time copy.

SUMMARY

A computer-implemented method according to one embodiment includes, prior to executing a point-in-time copy job, running a space checker program to generate a list that includes: source data sets that will be used in the point-in-time copy job and a pool of potential target volumes that are eligible to be used for the point-in-time copy job. The method further includes determining that insufficient space is available on the potential target volumes to perform the point-in-time copy job. An on-demand migration is issued against one or more target volumes of the pool of potential target volumes for ensuring there is sufficient space available on the one or more target volumes associated with the issued on-demand migration to perform the point-in-time copy job. The method further includes performing the point-in-time copy job.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments for ensuring sufficient space is available on target volumes before performing a point-in-time copy job.

In one general embodiment, a computer-implemented method includes, prior to executing a point-in-time copy job, running a space checker program to generate a list that includes: source data sets that will be used in the point-in-time copy job and a pool of potential target volumes that are eligible to be used for the point-in-time copy job. The method further includes determining that insufficient space is available on the potential target volumes to perform the point-in-time copy job. An on-demand migration is issued against one or more target volumes of the pool of potential target volumes for ensuring there is sufficient space available on the one or more target volumes associated with the issued on-demand migration to perform the point-in-time copy job. The method further includes performing the point-in-time copy job.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Figure 1:
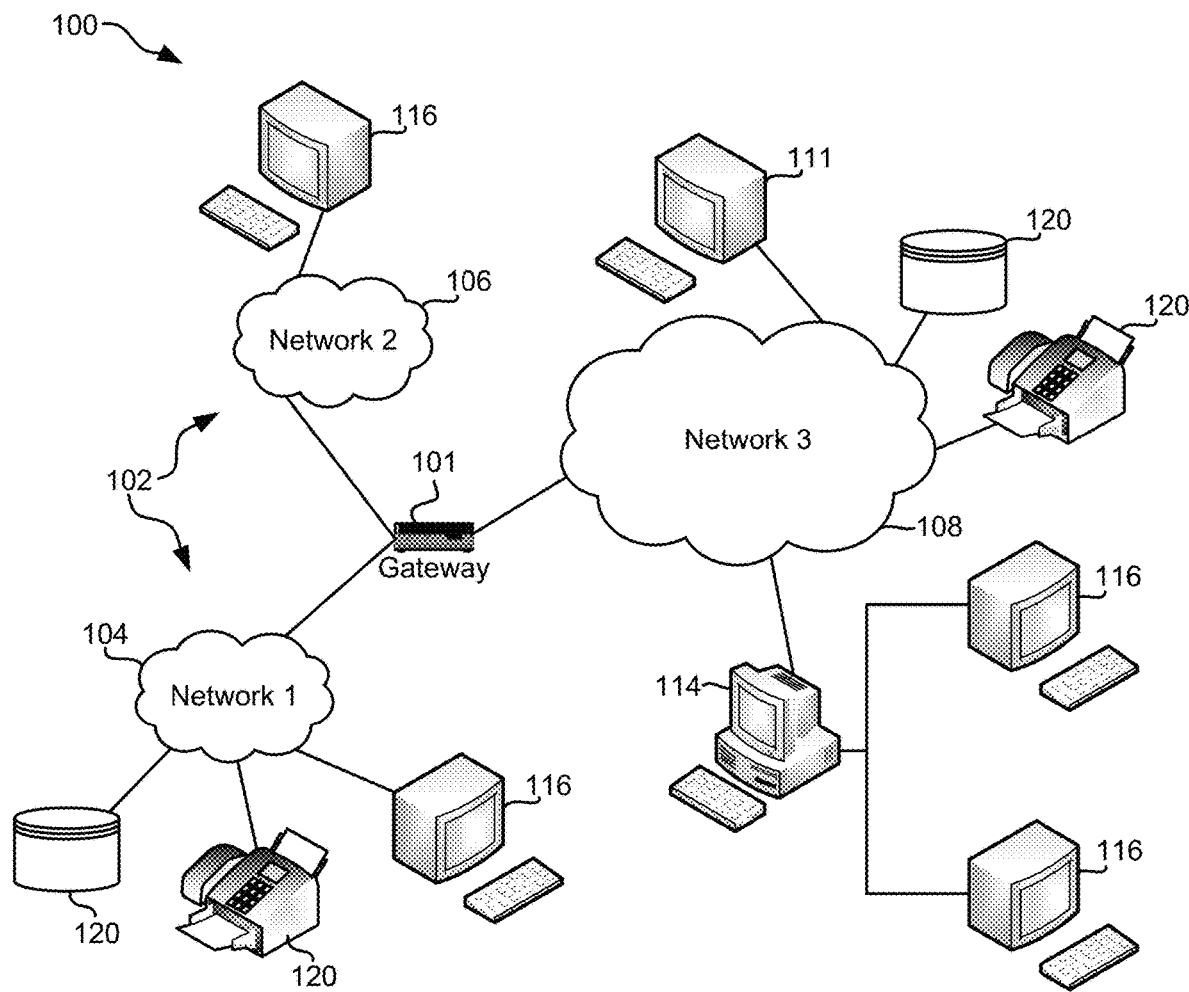
FIG. 1 is a diagram of a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
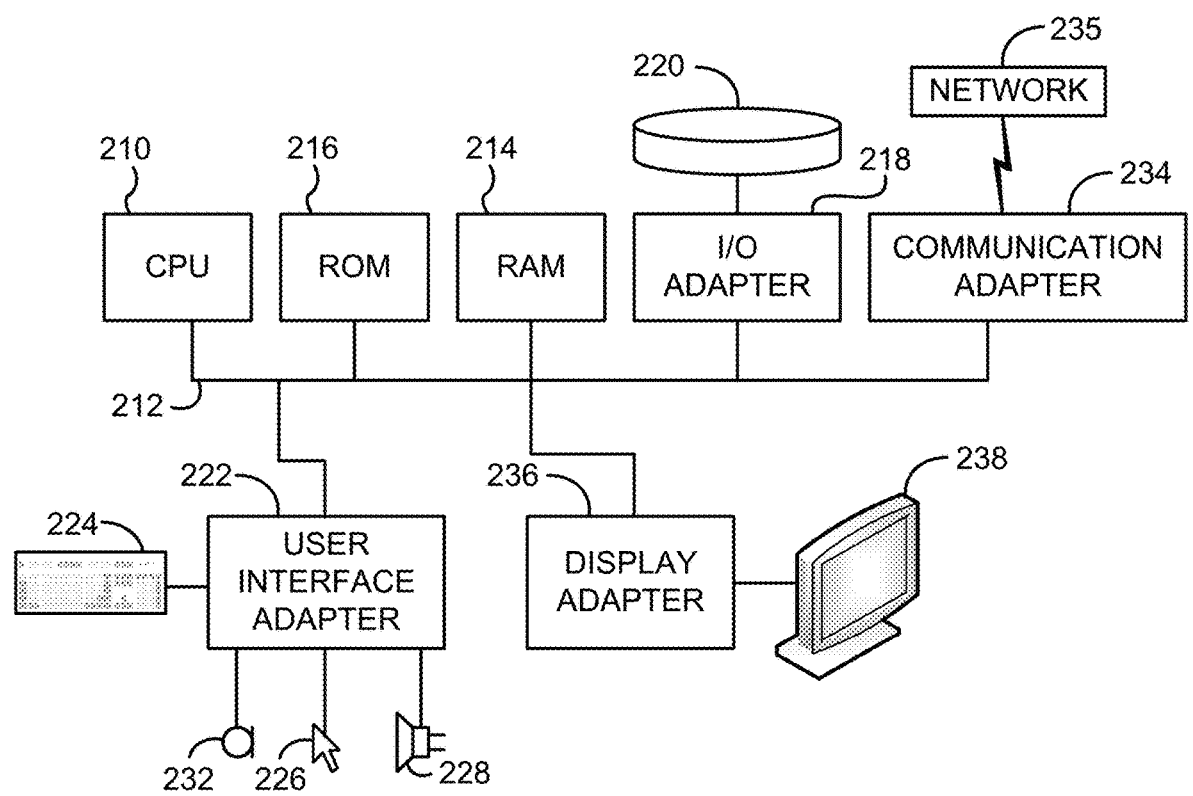
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
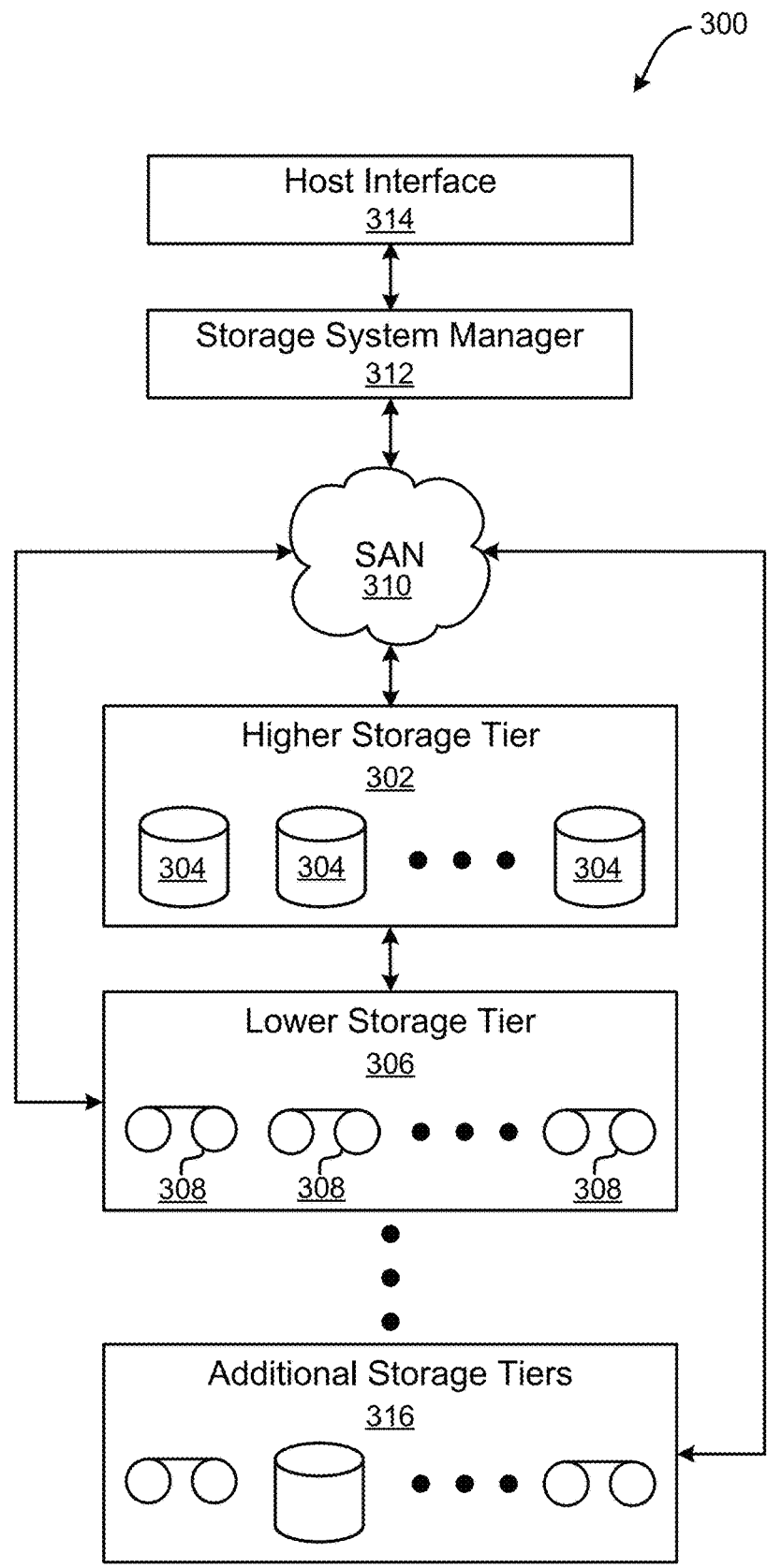
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere herein, in some conventional environments, point-in-time copies of data are performed on source data sets in order to make a point-in-time copy of the data immediately available for read and/or write access on a participating target volume. These copies may include up to full volume copies of the data, and are often performed as part of a routine data backup process. Upon initiating a point-in-time copy operation, a point-in-time copy relationship is created between a source volume and a target volume. A point-in-time copy relationship typically includes a "mapping" of the point-in-time copy source volume and a point-in-time copy target volume. This mapping allows a point-in-time copy of a source data set of a source volume to be copied to the associated target volume. The point-in-time copy relationship may exist between this volume pair from the time that the point-in-time copy operation is initiated until a storage unit copies all data from the source volume to the target volume or the point-in-time copy relationship is deleted, in cases of a persistent point-in-time copy.

When conventional point-in-time copy jobs are run, e.g., with copy/backup programs configured to copy, move, dump, and restore data sets and volumes, the jobs may fail if a point-in-time copy is initiated, and sufficient space is not available on the point-in-time copy eligible target volumes. In cases in which the job succeeds because a point-in-time copy is not utilized, the overall elapsed time of the job is relatively much longer because normal I/O is used. This performance degradation may cause other issues for clients like missing service-level agreements (SLAs) or backup windows. Furthermore, when these issues take place, in order to diagnose why a point-in-time copy job was not utilized, the job is often rerun with tracing, e.g., such as storage management services (SMS) tracing, to determine why space was not allocated on a point-in-time eligible volume. The missed SLAs and debugging performed, e.g., which typically requires recreating the failure in order to determine a root cause of the failure, as a result of the point-in-time copy not being utilized can represent significant penalties, costs, and may prove to be a source of dissatisfaction of the architecture to the client.

Various embodiments and approaches described herein prevent failure events associated with point-in-time full volume copies of data being performed on source data sets where sufficient space is not available on participating target volumes. These failure events are prevented as a result of performing proactive steps to ensure that sufficient space is available on point-in-time copy eligible target volumes before point-in-time copy jobs are run. More specifically, prior to executing a point-in-time copy job, the same data selection criteria of the point-in-time copy job is utilized by a space checking job to determine how much target space is required for a successful execution of the point-in-time copy job. If insufficient space is available, operations are performed to free up storage space on the target volumes in order to ensure clients that point-in-time copy job have sufficient space to be successfully run.

Figure 4:
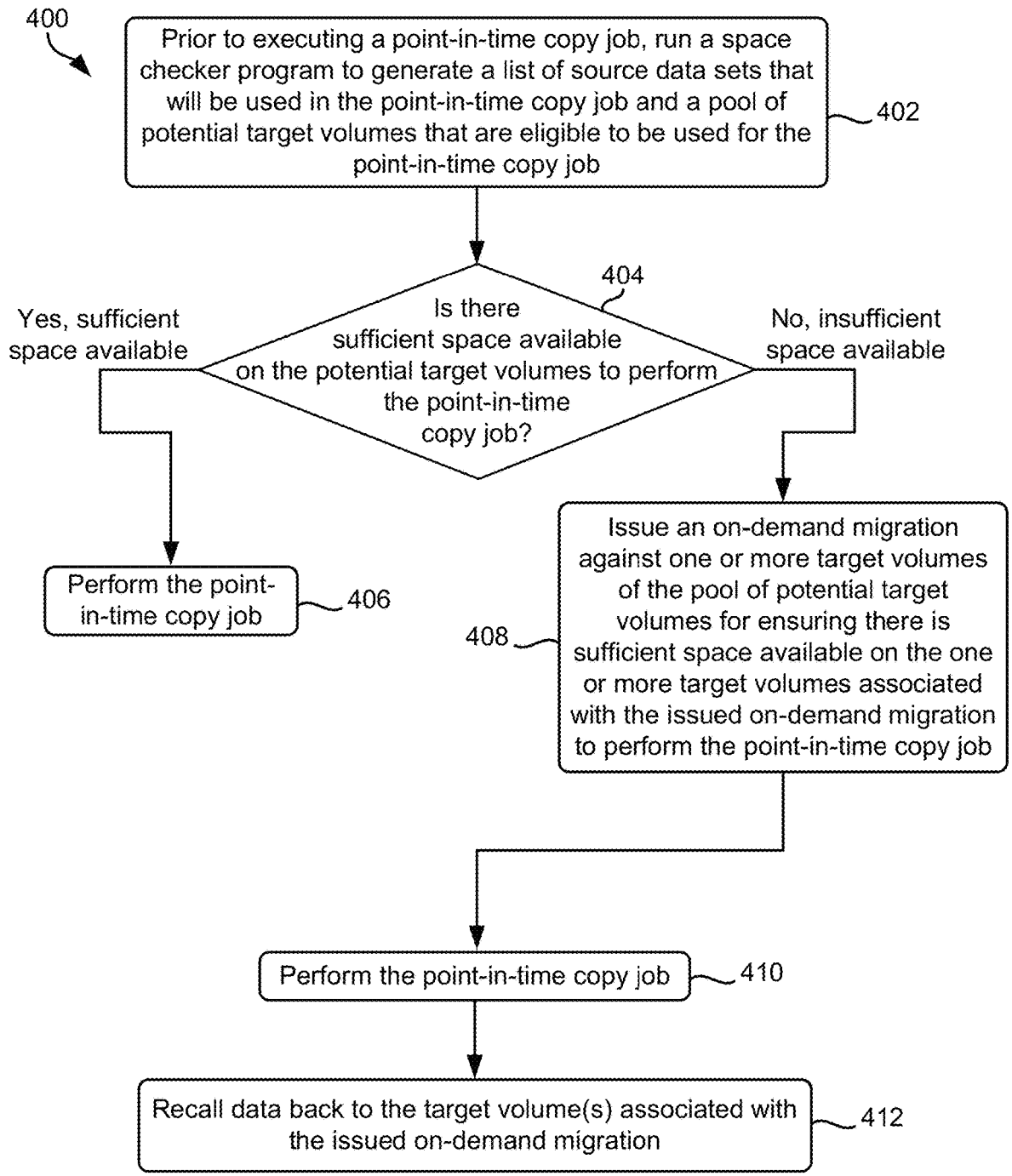
FIG. 4 is a flowchart of a method, in accordance with one embodiment.

Now referring to FIG. 4, a flowchart of a method 400 is shown according to one embodiment. The method 400 may be performed in accordance with the present invention in any of the environments depicted in FIGS. 1-5, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that various operations of method 400 may be performed to prevent failure events associated with point-in-time full volume copies of data being performed on a source data set where sufficient space is not available on participating target volumes. According to a more specific approach, the point-in-time copy job may be a FlashCopy operation by IBM®. In some other approaches, the point-in-time copy job may be a known type of point-in-time copy operation. Various operations of method 400 may be performed in response to receiving a request to perform a point-in-time copy of data between a source site and a target site of a data storage environment. Depending on the approach, the source site may include one or more components, e.g., one or more storage devices that are in communication with one or more client applications, a storage controller, a tiered data storage location, etc. Accordingly, the source data sets may be located across more than one storage device in some approaches. In contrast, in some other approaches, the source data sets may be located on a single storage device. The storage device(s) may include any one or more storage devices, e.g., a disk drive, a SSD, a magnetic recording tape drive, etc. The storage device(s) may additionally and/or alternatively include a single recording medium, e.g., such as a disk, an SSD memory array, a magnetic recording tape, etc. The target site of the data storage environment may include one or more components, e.g., one or more storage devices having any known type of recording media, a storage controller, at least some tiered data storage tiers, drives, etc. Accordingly, the target volumes may, in some approaches, be located across more than one storage device of the target site and may include any type of storage media and/or drives. In one preferred approach, the target site preferably includes a direct-access storage device (DASD). In contrast, in some other approaches, the target volumes may be located on a single storage device of the target site that includes any one or more types of storage media and/or drives. An optional operation of method 400 includes receiving a request to perform a point-in-time copy of data between the source site and the target site of the data storage environment. In contrast, various operations of method 400 may be performed without receiving such a request. For example, in some approaches, various operations of method 400 may be performed according to a predetermined process, such as a point-in-time copy of data that occurs every predetermined amount of time to ensure that source data sets of the source site are backed-up.

Prior to executing a point-in-time copy job, a space checker program, e.g., a point-in-time copy space checker program, is run to generate a list of source data sets that will be used in the point-in-time copy job and a pool of potential target volumes that are eligible to be used for the point-in-time copy job, e.g., see operation 402 of method 400. The space checker program may include a filter that when applied, is configured to identify fully-qualified names of source data sets that are going to be involved with the point-in-time copy job. The space checker program may in some approaches be run by one or more devices of the source site, e.g., such as by a client device of the source site. In some alternate approaches, the space checker program may be run an off-site computing device that has access to and/or knowledge of source data sets stored on the source site. Similarly, the space checker program may be run an off-site computing device that has access to and/or knowledge of a current storage usage of the target site.

In some approaches, the space checker program implements an operation that includes determining the source data sets that are to be used as input for the point-in-time copy job. The space checker program may additionally and/or alternatively implement an operation that includes determining the pool of potential target volumes that are eligible to be used for the point-in-time copy job, e.g., such as from a storage group that includes a pool of virtual disks that have similar attributes but reside on different storage controllers. The source data sets and/or the potential target volumes are in some approaches determined using information specified in the point-in-time copy job that details what is to be copied and where it is to be copied to. In one example, a user request may specify such information by including a volume serial number, which may or may not be used, or other information that may be used to determine the pool of target volumes to allocate data to. According to another example, the point-in-time copy job may specify a predetermined filter function that may be applied to obtain results that include a selected list of potential target volumes. Such a function may use a source volume as input, and when applied, finds a list of possible target volumes, e.g., where the function is called (repeatedly) once for each source volume that contains one of the data sets to be copied. It should be noted that each of the potential target volumes is associated an amount of space that is required to make a copy of the data set that the potential target volume is a possible target for. Accordingly, parameters of the point-in-time copy job may be pasted into the space checker program, e.g., the filter of the space checker program, so that a data set and target selection equivalent to the point-in-time copy job takes place. In such an application of the parameters, as a result of the parameters of the point-in-time copy job being pasted into the space checker program, source data sets that will participate in the actual point-in-time copy job and a pool of potential target volumes that are eligible to be used for the point-in-time copy job may be determined, without the actual point-in-time copy job being performed. The list may then be generated, e.g., by recording an indication of the source data sets that will participate in the actual point-in-time copy job and a pool of potential target volumes that are eligible to be used for the point-in-time copy job using a known type of indicator.

For context, the generated list may be used to determine whether a size of the source data sets that will be used in the point-in-time copy job is greater than a size of storage space available on the potential target volumes. This way, rather than the point-in-time job failing as a result of the point-in-time job being initiated for the source data sets without sufficient storage space being available on target volumes of the target site, the point-in-time copy job may be postponed at least until sufficient storage space is made available on the target volumes of the target site. Accordingly, decision 404 of method 400 includes determining whether there is sufficient space available on the potential target volumes to perform the point-in-time copy job. Various sub-operations will now be described to detail how to, in some approaches, determine whether there is sufficient space available on the potential target volumes to perform the point-in-time copy job.

Figure 5:
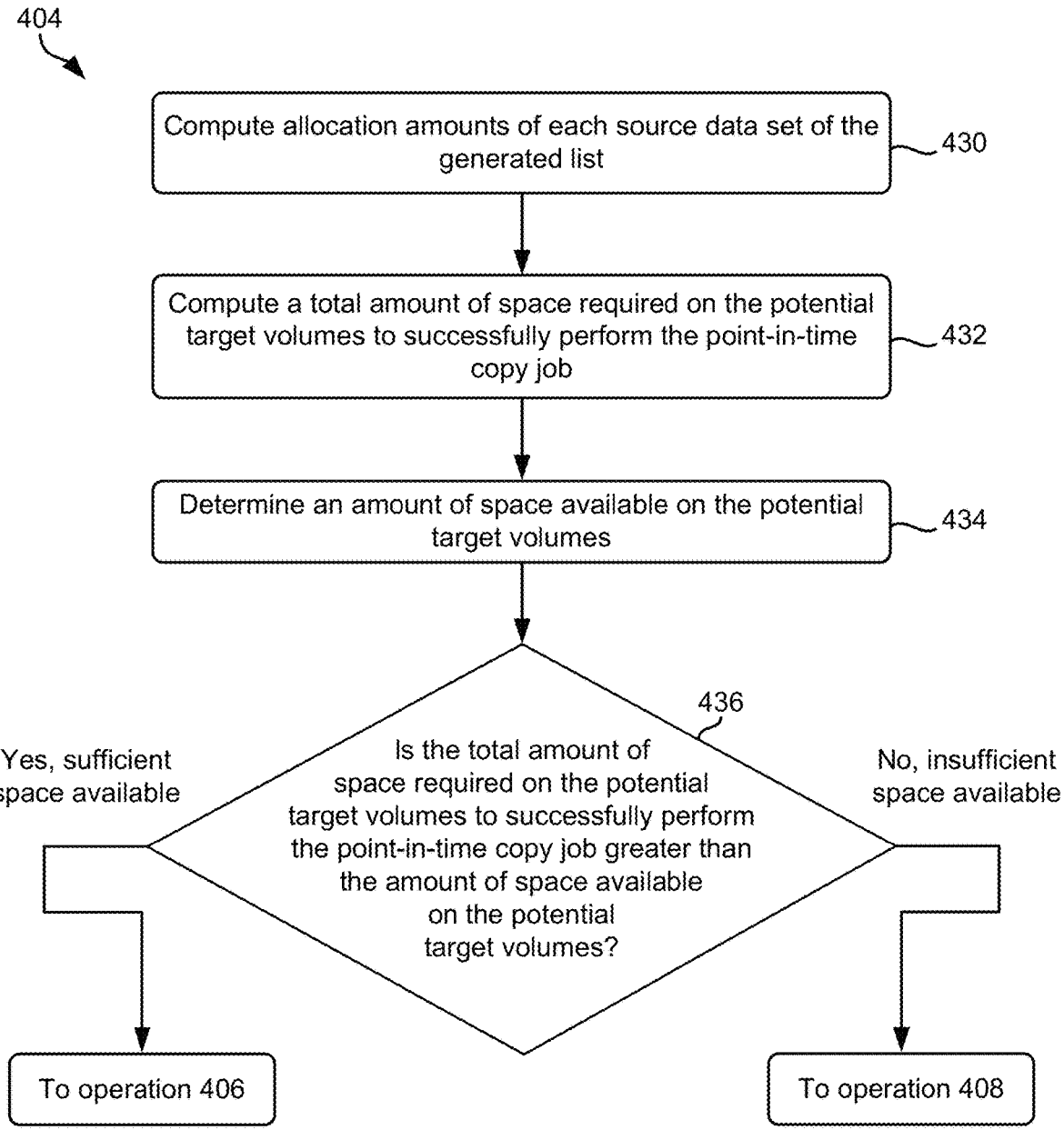
FIG. 5 is a flowchart of a plurality of sub-operations of an operation of the method of FIG. 4.

Looking to FIG. 5, exemplary sub-operations 430-436 are illustrated in accordance with one embodiment, one or more of which may be used to perform decision 404 of FIG. 4. However, it should be noted that the sub-operations of FIG. 4 are illustrated in accordance with one embodiment which is in no way intended to limit the invention. It should be noted that in some approaches, any one or more of the sub-operations of FIG. 5 may be performed by the space checker program. In some other approaches, the results of such sub-operations may be, e.g., predetermined, received, estimated using one or more known estimation techniques, etc.

Sub-operation 430 includes computing allocation amounts of each source data set of the generated list. The allocation amounts of at least some of the source data sets may be computed using information stored in a catalog and/or a volume table of contents (VTOC) which may be stored on the volume itself. The catalog information provides the volume location of each data set on the source site. In some approaches in which the source data is stored with associated records that are in a unique format that is not able to be understood by other access methods, e.g., such as in environments that utilize Virtual Storage Access Method (VSAM), the catalog information may also contain space allocation. The VTOC on each volume may include space allocation information, which may be used by an extent application for non-VSAM data sets in order to compute the allocation amounts of at least some of the source data sets. The extent application may additionally and/or alternatively identify locations, specific tracks that the source data is located on, one or more extent ranges that the source data belongs to, etc. A total size of the information that is to be moved to the target volumes may then be computed using the obtained information. The total size of the information that is to be moved from the source data sets to the target volumes may also be considered and referred to herein as the minimum total amount of space required on the potential target volumes to successfully perform the point-in-time copy job, e.g., see sub-operation 432. This is because if the potential target volumes do not include available space that is at least the total size of the information that is to be moved from the source data sets to the target volumes during the point-in-time copy job, the point-in-time copy job will be unsuccessful. Accordingly, in some approaches, the total amount of space required on the potential target volumes to successfully perform the point-in-time copy job may be computed by adding for each of the source data sets, an amount of space associated therewith, e.g., adding a space required for each data set being processed. According to a more specific example, where the data is stored on tracks, space of each of the tracks that the source data is determined to be stored on may be added to determine the total amount of space required on the potential target volumes to successfully perform the point-in-time copy job. Note that for some approaches in which the amount of data calls for an entire volume to be copied, the total amount of space is preferably also calculated using the VTOC information. In contrast, where the source data set is a VSAM data set, a catalog may be used to determine the total amount of space required on the potential target volumes to successfully perform the point-in-time copy job. For example, for a name of a data set that is to participate in the point-in-time copy job, the catalog may be referenced to determine information about the data set, e.g., such as a volume that the associated data set is located on and a size of the data set which may be used to determine the total amount of space required on the potential target volumes to successfully perform the point-in-time copy job.

It should be realized that in some approaches, at least some time may pass between running the space checker program and performing the point-in-time copy job. In this time between running the space checker program and performing the point-in-time copy job, at least some modifications may occur on the source site, e.g., read and/or write operations, which may increase and/or decrease a size of the source data sets that will be used in the point-in-time copy job. This may also increase or decrease a total amount of space required on the potential target volumes to successfully perform the point-in-time copy job. Accordingly, to allow for possible data set growth between operations of the space checker and point-in-time copy, a configurable amount of over-allocation may be included in the computed total amount of space required on the potential target volumes to successfully perform the point-in-time copy job. In some approaches the over-allocation may be any predetermined amount of storage space. In some other approaches the over-allocation may be determined using one or more predetermined rules. For example, a rule used to determine the over-allocation may include the over-allocation being a predetermined ratio, e.g., a percentage, of the computed total amount of space required on the potential target volumes to successfully perform the point-in-time copy job. This rule may enable migration efficiencies by minimizing an amount of data that is unnecessarily migrated off the target volumes to other storage in order to perform the point-in-time copy job. This is because otherwise setting the over-allocation to be a predetermined amount of storage space regardless of a size of the computed total amount of space required on the potential target volumes does not consider a relative size of the source data set. As a result, the size of the over-allocation may be significantly larger than a size of the modification made to the source site between running the space checker program and performing the point-in-time copy job. In some other approaches, the over-allocation may be dynamically set based on an average of the sizes of data additions and/or deletions to source data sets that occur between running the space checker program and performing the point-in-time copy job for a predetermined number of previous point-in-time copy jobs.

Sub-operation 434 includes determining an amount of space available on the potential target volumes. In some approaches, a known type of query may be performed using the space checker program to determine how much space is available on each of the potential target volumes. The amount of space available on the potential target volumes may additionally and/or alternatively be determined by utilizing Storage Facility Image (SFI) information, which may have also been used to identify potential target volumes. The SFI information provides how much target volume space is available, in addition to which volumes are compatible matches for a point-in-time copy type job. Each of the potential target volumes are also preferably ensured to be compatible with a point-in-time copy job. For context with respect to the term "compatible," it should be noted that the target volumes may be associated with a storage group that includes a plurality of target volumes on the target site, and which may reside on different physical storage controllers. For example, there may be ten different storage controller boxes, and a storage group may have some storage across the ten different storage controller boxes. However, for a point-in-time copy job, compatible target volumes are generally located within the same logical partition or at least on the same storage controller box, which ensures that the target volumes are compatible with the source data set. Accordingly, a given potential target volume may have storage space available, but the given potential target volume will not be incorporated in determining the amount of space available on the potential target volumes in response to a determination that the given potential target volume is not compatible with the point-in-time copy job of the source site. Accordingly, it should be noted the operations of method 400 are described to be performed for a source data set that exists on the same storage device and therefore only a single source pool of potential target volumes may be considered. However, in some other approaches, the source data sets may exist on more than one storage devices, e.g., such as where ten files are located across ten different devices on the source site. In such approaches, various operations of method 400 may be parallelly preformed, e.g., a different storage pool of potential target volumes may be considered and used for each data set residing on a different storage device. More specifically, in such approaches, a minimum total amount of space required on the potential target volumes of a storage group may be determined for each of the storage pools, e.g., ten storage pools for the example above, and it may be determined for the potential target volumes of each of the storage pools whether a sufficient amount of space is available to successfully perform the point-in-time copy job before actually performing the point-in-time copy job.

The space determined to be available on each of the potential target volumes may be summed to determine the total amount of space available on the potential target volumes. It should be noted that the term "available" of "space available on the potential target volumes" preferably refers to space that is available for use without first having to migrate data stored thereon to other storage. By checking the data sets that are going to be processed and the target space available, a determination can be made as to whether the point-in-time copy job will be successful. As illustrated in sub-operation 436, such a determination may be based on whether there is the total amount of space required on the potential target volumes to successfully perform the pointin-time copy job greater than the amount of space available on the potential target volumes. Note that in some approaches, the determination may additionally and/or alternatively be based on the whether the total amount of space required on the potential target volumes to successfully perform the point-in-time copy job is equal to the amount of space available on the potential target volumes. In response to a determination that the total amount of space required on the potential target volumes to successfully perform the point-in-time copy job is greater than, or in some approaches equal to, the amount of space available on the potential target volumes (e.g., as illustrated by the "Yes, sufficient space available" logical path of sub-operation 436), it may be determined that there is sufficient space available on the potential target volumes to perform the point-in-time copy job. Based on one or more of these determinations, the method continues to operation 406, e.g., see the "Yes, sufficient space available" logical paths of decision 404 and sub-operation 436 continue to operation 406 of method 400. Operation 406 of method 400 includes performing the point-in-time copy job. With reference again to FIG. 5, in response to a determination that the total amount of space required on the potential target volumes to successfully perform the point-in-time copy job is not greater than, e.g., preferably less than, the amount of space available on the potential target volumes (e.g., as illustrated by the "No, insufficient space available" logical path of sub-operation 436), it may be determined that there is not sufficient space available on the potential target volumes to perform the point-in-time copy job. Based on this determination, the method continues to operation 408, e.g., see the "No, insufficient space available" logical paths of decision 404 and sub-operation 436 continue to operation 408 of method 400. As will now be described below, in response to a determination that there is insufficient space available on the potential target volumes to perform the point-in-time copy job, one or more operations may be performed to free up space on the potential target volumes prior to the point-in-time copy job being executed.

Operation 408 of method 400 includes issuing an on-demand migration against one or more target volumes of the pool of potential target volumes for ensuring there is sufficient space available on the one or more target volumes to perform the point-in-time copy job. In one approach, the on-demand migration is issued to a storage controller to move data off of and/or to free space on the one or more target volumes associated with the issued on-demand migration. In another approach, the on-demand migration is issued against one or more target volumes of the pool of potential target volumes to move data to other storage, e.g., a lower tier of storage in a multi-tier hierarchical storage environment of the target site, predetermined migration level one volumes, a DASD, magnetic recording tape, to a temporary storage device of the target site, to an archival storage media of the target site, to a device of the source site, etc. Note that where potential target volumes of multiple storage pools are considered based on the source data sets being stored on more than one storage device, the on-demand migration may be issued on potential target volumes of storage pools determined to not have sufficient space for performing a corresponding portion of point-in-time copy job. In one approach, the on-demand migration is issued until there is sufficient space available on the target volumes associated with the issued on-demand migration to perform the point-in-time copy job. In some approaches, the on-demand migration is issued on any one or more of the potential target volumes until there is sufficient space available on the target volumes associated with the issued on-demand migration to perform the point-in-time copy job. In contrast, in some other approaches, the on-demand migration may be issued and performed according to a predetermined order. For example, in order to reduce the number of target volumes associated with the issued on-demand migration, in some approaches, one of the potential target volumes having a size that is at least equal to the total amount of space required on the potential target volumes to successfully perform the point-in-time copy job, may be identified. Moreover, the on-demand migration may be caused to be performed on data of the identified target volume. As a result of identifying and causing the on-demand migration be performed on data of a target volume having a size that is at least equal to the total amount of space required on the potential target volumes to successfully perform the point-in-time copy job, data is migrated only from a single one of the potential target volumes rather than a plurality of potential target volumes. This improves performance of the data storage environment in reducing an extent of downtime of target volumes on the target site that results from migrating and/or recalling data from a target volume in order to perform the point-in-time copy job. In some other approaches, migrations of data may be iteratively performed from the potential target volumes until there is sufficient space available on the target volumes associated with the issued on-demand migration to perform the point-in-time copy job. More specifically, in one approach, it may be determined, after each migration iteration or equivalently a portion thereof, whether there is sufficient space available on the target volumes associated with the issued on-demand migration to perform the point-in-time copy job. Iteratively migrating data from the target volumes associated with the issued on-demand migration may ensure that data is not migrated from one of the potential target volumes that thereafter is not used to perform the point-in-time copy job. This improves performance of the data storage environment in reducing an extent of downtime of target volumes on the target site that results from migrating and/or recalling data from a target volume in order to perform the point-in-time copy job.

One or more predetermined specified criterion may additionally and/or alternatively be incorporated into the issued on-demand migration. For example, target volumes, of the pool of potential target volumes, may be selected for using in the on-demand migration based on a determination, e.g., using a query of the space checker program for data sets that meet a specified criterion where the potential target volumes are inputs to the query, that data of the target volumes matches the predetermined criterion. Various examples of predetermined criterion that may be incorporated into the issued on-demand migration may include, data having a last access date, data having a first access date, data that has been accessed at least a predetermined number of times within a predetermined period of time, data that has not been accessed at least a predetermined number of time within a predetermined period of time, data having another mirrored instance on the source site and/or on the target site, data that is scheduled to be archived, data that is scheduled to be deleted, data that is corrupted, data of at least a predetermined size that has not been accessed in at least a predetermined amount of time, etc. Any other known types of client space management criterium, e.g., such as "no-migrate" conditions for predetermined extents of data, may additionally and/or alternatively incorporated into the issued on-demand migration. In some approaches, a query may be performed, e.g., by the space checker program, to determine a collection of data of a plurality of potential target volumes, where each portion of the data meets a predetermined criteria and where the collection of data is of a size that, if migrated from the potential target volumes, makes sufficient space available on the target volumes associated with the issued on-demand migration to perform the point-in-time copy job. The on-demand migration may be issued on the potential target volumes associated with the collection of data. Other data management processes, e.g., such as garbage collection processed that cause storage space to become available, may additionally and/or alternatively be initiated in order to cause sufficient space to become available on the target volumes.

A query may again be issued when that migration completes in order to confirm sufficient space is then available. If insufficient space is still available, the migration criteria will be modified, e.g., thresholds applied in a previous iteration are lowered a predetermined amount, to allow for additional data sets to be migrated from potential target volumes. This iteration may continue until it is determined that sufficient space is available on the target volumes associated with the issued on-demand migration to perform the point-in-time copy job.

Operation 410 includes performing the point-in-time copy job. The point-in-time copy job is in some approaches performed after the space checker program has run and/or in response to a determination that sufficient space for performing the point-in-time copy job is available on the target volumes. In some approaches, once a copy of the source data sets is made on the target volumes associated with the point-in-time copy job, an application may perform updates to the original source data sets. In the meantime, the copy of the source data sets may be used to perform a backup to other storage, e.g., such as magnetic recording tape, DASD, etc., which may take longer than the time that performing the point-in-time copy job required. Once the point-in-time copy job has been completed and/or associated backups using those point-in-time copy data sets have been completed, space is then available in the target volumes for recalling data, e.g., the data migrated during the on-demand migration may be recalled to the target volumes associated with the issued on-demand migration. Accordingly, operation 412 includes recalling data back to the target volume(s) associated with the issued on-demand migration. According to one approach, the data may be recalled in response to the point-in-time copy job being performed. In another approach, in response to a determination that storage space of the target volumes associated with the issued on-demand migration has become available, any data sets that were migrated earlier than the normal migration criteria may automatically recalled. In some other approaches, data of the target volume(s) that was previously migrated to other storage as a result of the on-demand migration being issued may be recalled back to the target volume(s) associated with the issued on-demand migration in response to a determination that a condition has been met, e.g., the data has been requested a predetermined number of times such as in a multi-tier hierarchical storage environment of the target site, the data has been deleted in the source site, etc.

Various performance benefits are experienced by ensuring sufficient space is available on one or more target volumes before performing a point-in-time copy job in a data storage environment, e.g., such as a data storage environment that includes a source site having source data sets and a target site having target volumes. These performance benefits are realized in noting that in the event that a point-in-time copy job being performed fails as a result of the point-in-time copy job being initiated and sufficient space is not available on point-in-time copy eligible target volumes, a time consuming and resource consuming process is used to recover from the failure. Specifically, the overall elapsed time of the job is relatively much longer because normal I/O is used, which, as described elsewhere herein, may cause other issues for clients like missing SLAs or backup windows. The recovery is likely to further include rerunning the job with tracing to determine why space was not allocated on a point-in-time eligible volume, which further prolongs the recovery. However, this compromises user data because a backup of the data that relies on the point-in-time copy to be successfully performed is postponed at least until the recovery is successfully performed. This is also detrimental to customer relationships because it is difficult to prove to customers that are subjected to such a failure event, why the point-in-time copy job failed when it may have appeared upon initiating the point-in-time copy, that sufficient space was available on the target volumes. Accordingly, as a result of implementing the techniques of various embodiments and approaches described herein to ensure sufficient space is available on target volumes before performing a point-in-time copy job in a data storage environment, performance of the data storage environment improves, particularly with respect to processing resources, customer relationships and processing time being preserved as a result of failures being prevented. Furthermore, it should be distinguished that the techniques described in various embodiments and approaches herein to ensure sufficient space is available on target volumes before performing a point-in-time copy job in a data storage environment have heretofore not been considered in conventional data storage environments. Accordingly, the inventive discoveries disclosed herein with regards to determining whether there is sufficient space available on potential target volumes to perform a point-in-time copy job, and if not, causing sufficient to become available, thereon proceeds contrary to conventional wisdom.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
prior to executing a point-in-time copy job from a source site to a target site, running a space checker program to generate a list that includes: source data sets of the source site that will be used in the point-in-time copy job and a pool of potential target volumes of the target site that are eligible to be used for the point-in-time copy job;
compute, based on the generated list, a total amount of space required on the potential target volumes to successfully perform the point-in-time copy job, wherein a predetermined amount of over-allocation is added to the computed total amount of space, wherein the predetermined amount of over-allocation is an average of sizes of data additions and/or deletions to source data sets of the source site that have occurred between running the space checker program and performing a point-in-time copy job for a predetermined number of previous point-in-time copy jobs;
determining that the computed total amount of space is not available on the potential target volumes to successfully perform the point-in-time copy job;
in response to the determination that the computed total amount of space is not available on the potential target volumes to successfully perform the point-in-time copy job, issuing an on-demand migration against at least one target volume of the pool of potential target volumes for ensuring that the computed total amount of space is available on the at least one target volume associated with the issued on-demand migration to successfully perform the point-in-time copy job; and
performing the point-in-time copy job.

2. The computer-implemented method of claim 1, wherein data is migrated from the at least one target volume to a magnetic recording tape during the on-demand migration, and comprising: in response to a determination that a copy of the data has been deleted on the source site, recalling the data back to the target volume(s) associated with the issued on-demand migration.

3. The computer-implemented method of claim 1, wherein determining that the computed total amount of space is not available on the potential target volumes includes: computing allocation amounts of each source data set, wherein the computed total amount of space is a sum of, amounts of space associated with the source data sets and the predetermined amount of over-allocation.

4. The computer-implemented method of claim 3, wherein the allocation amounts of at least some of the source data sets are computed using information stored in a volume table of contents (VTOC).

5. The computer-implemented method of claim 1, wherein issuing the on-demand migration includes: identifying one of the potential target volumes having a size that is at least equal to the computed total amount of space, and causing the on-demand migration to be performed on data of the identified target volume.

6. The computer-implemented method of claim 1, wherein issuing the on-demand migration includes: iteratively performing migrations of data from the potential target volumes, and determining, after each migration iteration, whether there is at least the computed total amount of space available on the target volumes associated with the issued on-demand migration.

7. The computer-implemented method of claim 1, wherein the space checker program implements operations including:
determining the source data sets that are to be used as input for the point-in-time copy job;
determining the pool of potential target volumes that are eligible to be used for the point-in-time copy job;
generating the list; and
computing the total amount of space required on the potential target volumes to successfully perform the point-in-time copy job.

8. The computer-implemented method of claim 1, wherein the source data sets are located on a single storage device and/or a single recording medium.

9. A computer program product, the computer program product comprising a computer readable storage medium having program instructions embodied therewith, the program instructions readable and/or executable by a computer to cause the computer to:
prior to executing a point-in-time copy job from a source site to a target site, run, by the computer, a space checker program to generate a list that includes: source data sets of the source site that will be used in the point-in-time copy job and a pool of potential target volumes of the target site that are eligible to be used for the point-in-time copy job;
compute, by the computer, based on the generated list, a total amount of space required on the potential target volumes to successfully perform the point-in-time copy job, wherein a predetermined amount of over-allocation is added to the computed total amount of space, wherein the predetermined amount of over-allocation is an average of sizes of data additions and/or deletions to source data sets of the source site that have occurred between running the space checker program and performing a point-in-time copy job for a predetermined number of previous point-in-time copy jobs;
determine, by the computer, that the computed total amount of space is not available on the potential target volumes to successfully perform the point-in-time copy job;
in response to the determination that the computed total amount of space is not available on the potential target volumes to successfully perform the point-in-time copy job, issue, by the computer, an on-demand migration against at least one target volume of the pool of potential target volumes for ensuring that the computed total amount of space is available on the at least one target volume associated with the issued on-demand migration to successfully perform the point-in-time copy job; and
perform, by the computer, the point-in-time copy job.

10. The computer program product of claim 9, wherein data is migrated from the at least one target volume to a magnetic recording tape during the on-demand migration, and the program instructions readable and/or executable by a computer to cause the computer to: in response to a determination that a copy of the data has been deleted on the source site, recall, by the computer, the data back to the target volume(s) associated with the issued on-demand migration.

11. The computer program product of claim 9, wherein determining that the computed total amount of space is not is available on the potential target volumes includes: computing allocation amounts of each source data set, wherein the computed total amount of space is a sum of, amounts of space associated with the source data sets and the predetermined amount of over-allocation.

12. The computer program product of claim 11, wherein the allocation amounts of at least some of the source data sets are computed using information stored in a volume table of contents (VTOC).

13. The computer program product of claim 9, wherein issuing the on-demand migration includes: identifying one of the potential target volumes having a size that is at least equal to the computed total amount of space, and causing the on-demand migration to be performed on data of the identified target volume.

14. The computer program product of claim 9, wherein issuing the on-demand migration includes: iteratively performing migrations of data from the potential target volumes, and determining, after each migration iteration, whether there is at least the computed total amount of space available on the target volumes associated with the issued on-demand migration.

15. The computer program product of claim 9, wherein the space checker program implements operations including:
   determining the source data sets that are to be used as input for the point-in-time copy job;
   determining the pool of potential target volumes that are eligible to be used for the point-in-time copy job;
   generating the list; and
   computing the total amount of space required on the potential target volumes to successfully perform the point-in-time copy job.

16. The computer program product of claim 9, wherein the source data sets are located on a single storage device and/or a single recording medium.

17. A system, comprising:
   a processor; and
   logic integrated with the processor, executable by the processor, or integrated with and executable by the processor, the logic being configured to:
   prior to executing a point-in-time copy job from a source site to a target site, run a space checker program to generate a list that includes: source data sets of the source site that will be used in the point-in-time copy job and a pool of potential target volumes of the target site that are eligible to be used for the point-in-time copy job;
   compute, based on the generated list, a total amount of space required on the potential target volumes to successfully perform the point-in-time copy job, wherein a predetermined amount of over-allocation is added to the computed total amount of space, wherein the predetermined amount of over-allocation is a predetermined percentage of the computed total amount of space required on the potential target volumes to successfully perform the point-in-time copy job;
   determine that the computed total amount of space is not available on the potential target volumes to successfully perform the point-in-time copy job;
   in response to the determination that the computed total amount of space is not available on the potential target volumes to perform the point-in-time copy job, issue an on-demand migration against at least one target volume of the pool of potential target volumes for ensuring that the computed total amount of space is available on the at least one target volume associated with the issued on-demand migration to successfully perform the point-in-time copy job; and
   perform the point-in-time copy job.

18. The system of claim 17, wherein data is migrated from the at least one target volume to a direct-access storage device (DASD) during the on-demand migration, and the logic being configured to: in response to a determination that a copy of the data has been deleted on the source site, recall the data back to the target volume(s) associated with the issued on-demand migration.

19. The system of claim 17, wherein determining that the computed total amount of space is not available on the potential target volumes includes: computing allocation amounts of each source data set, wherein the computed total amount of space is a sum of amounts of space associated with the source data sets and the predetermined amount of over-allocation.

20. The system of claim 19, wherein the allocation amounts of at least some of the source data sets are computed using information stored in a catalog and/or a volume table of contents (VTOC).

21. The system of claim 17, wherein issuing the on-demand migration includes: identifying one of the potential target volumes having a size that is at least equal to the computed total amount of space, and causing the on-demand migration to be performed on data of the identified target volume.

22. The system of claim 17, wherein issuing the on-demand migration includes: iteratively performing migrations of data from the potential target volumes, and determining, after each migration iteration, whether there is at least the computed total amount of space available on the target volumes associated with the issued on-demand migration.

23. The system of claim 17, wherein the space checker program implements operations including:
   determining the source data sets that are to be used as input for the point-in-time copy job;
   determining the pool of potential target volumes that are eligible to be used for the point-in-time copy job;
   generating the list; and
   computing the total amount of space required on the potential target volumes to successfully perform the point-in-time copy job.

24. The system of claim 17, wherein the predetermined amount of over-allocation is additionally based on an average of sizes of data additions and/or deletions to source data sets of the source site that have occurred between running the space checker program and performing a point-in-time copy job for a predetermined number of previous point-in-time copy jobs.

* * * * *